United States Patent
Meerpohl et al.

(10) Patent No.: US 9,547,084 B2
(45) Date of Patent: Jan. 17, 2017

(54) METHOD AND DEVICE FOR CLASSIFYING WATERCRAFT

(71) Applicant: ATLAS ELEKTRONIK GmbH, Bremen (DE)

(72) Inventors: Gregor Meerpohl, Wildeshausen (DE); Thomas Kruger, Bremen (DE); Ralph Tieste, Osterholz-Scharmbeck (DE)

(73) Assignee: ATLAS ELEKTRONIK GmbH, Bremen (DE)

( * ) Notice: Subject to any disclaimer, the term of this patent is extended or adjusted under 35 U.S.C. 154(b) by 127 days.

(21) Appl. No.: 14/419,494

(22) PCT Filed: Jul. 2, 2013

(86) PCT No.: PCT/DE2013/100240
§ 371 (c)(1),
(2) Date: Feb. 4, 2015

(87) PCT Pub. No.: WO2014/023293
PCT Pub. Date: Feb. 13, 2014

(65) Prior Publication Data
US 2015/0219762 A1    Aug. 6, 2015

(30) Foreign Application Priority Data
Aug. 7, 2012 (DE) .................. 10 2012 015 638

(51) Int. Cl.
    *G01S 15/74*      (2006.01)
    *G01S 3/80*      (2006.01)

(52) U.S. Cl.
    CPC . *G01S 15/74* (2013.01); *G01S 3/80* (2013.01)

(58) Field of Classification Search
    CPC .................. G01S 15/74; G01S 3/80
    See application file for complete search history.

(56) References Cited

U.S. PATENT DOCUMENTS 3,790,927 A * 2/1974 Chwastyk ............... G01S 1/72
                                                102/402
5,559,758 A * 9/1996 Wilson ................... H01Q 3/26
                                                367/136

(Continued)

FOREIGN PATENT DOCUMENTS

DE      0152634      12/1981
DE      3148735      10/1986
(Continued)

OTHER PUBLICATIONS

Translation of DE3148735C2.*
(Continued)

*Primary Examiner* — Daniel Pihulic
(74) *Attorney, Agent, or Firm* — Pearl Cohen Zedek Latzer Baratz LLP

(57) ABSTRACT

The invention relates to a method of classifying one or several watercraft using the sound waves emitted or transmitted by these vehicles. The sound waves are thereby received using an array of underwater sound sensors of a sonar receiving system and processed into received signals. At least one amplitude spectrum is generated from these received signals consisting of one or more sets of frequency lines and any individual lines, from which the characteristic vehicle parameters are automatically determined in a frequency line pattern detection module or determined manually. Subsequently, the vehicle characteristic parameters are compared with the database parameters, where this comparison is evaluated with a matching factor. Considering the matching factor, one or several watercraft are determined as the result of the classification. In addition, the invention relates to a corresponding device for carrying out the process.

16 Claims, 3 Drawing Sheets

(56) References Cited

U.S. PATENT DOCUMENTS

2012/0324986 A1* 12/2012 Chekalyuk ............... G01J 3/02
                                                                                           73/61.52
2015/0219762 A1* 8/2015 Meerpohl ............... G01S 15/74
                                                                                           367/131

FOREIGN PATENT DOCUMENTS

| DE | 3531230 | 3/1987 |
| DE | 4141562 | 6/1993 |
| DE | 42 20 429 | 1/1994 |

OTHER PUBLICATIONS

Translation of DE3531230C2.*
Translation of DE4141562A1.*
Averson et al., "Radiated noise characteristics of a modern cargo ship", J. Acoust. Soc. Am. 107 (1), pp. 118-129, Jan. 2000.
Rajagopal et al., "Target classification in a passive sonar-an expert system approach", Acoustics, Speech, and Signal Processing, 1990. ICASSP-90., 1990 International Conference on Apr. 3-6, 1990.
Kil et al.,"Sonar target recognition", Wiley Encyclopedia of Electrical and Electronics, 1999.
Moura et al., "Passive Sonar Signal Detection and Classificaiton Based on Independent Component Analysis", Sonar Systems, Sep. 2011, p. 93-104.
Zak, "Ship's Hydroacoustics Sinatures Classification Using Neural Networks", Self Organizing Maps—Aplications and Novel Algorithm Design (2011) p. 209-232.
Soares-Filho et al., "Enlarging neural class detection capacity in passive sonar systems", IEEE International Symposium on Circuits and Systems (2002).
Kim et al., "Intelligent PSR Estimator for Feature Extraction of a Passive Sonar Target", International Journal of Control, Automation, and Systems (2010), p. 677-682.
McKenna et al., "Underwater radiated noise from modern commercial ships", The Journal of the Acoustical Society of America, American Institute of Physics for the Acoustical Society of America (2012), p. 92-103.

* cited by examiner

METHOD AND DEVICE FOR CLASSIFYING WATERCRAFT

CROSS-REFERENCE TO RELATED APPLICATIONS

This application is a National Phase Application of PCT International Application No. PCT/DE2013/100240, entitled "METHOD AND DEVICE FOR CLASSIFYING WATERCRAFT", International Filing Date Jul. 2, 2013, published on Feb. 13, 2014 as International Publication No. WO/2014/023293, which in turn claims priority from German Patent Application No. 102012015638.3, filed Aug. 7, 2012, all of which are incorporated herein by reference in their entirety.

FIELD OF THE INVENTION

The invention relates to a method for classifying one or more watercraft by means of sound waves emitted or sent by the watercraft.

BACKGROUND

It is known that watercraft, such as surface vessels, submarines, and such like, can be detected and classified by means of the operating noises they emit. For this purpose, these operating noises which are mainly caused by the prime movers, are received using a sonar system and related received signals are generated. Subsequently, the received signals are transformed into a frequency spectrum which is analyzed according to an absolute-value generation with respect to frequency lines and corresponding frequencies. Due to the driving propellers, turbines, generators and/or pumps, significant frequency lines are present in the amplitude spectrum generated from the frequency spectrum of the received signal.

DE 42 204 29 A1 shows a method for the detection and classification of a propeller-driven vessel on the basis of fuzzy logic. In this method, association functions are defined when it appears plausible that a spectral line exists in the frequency spectrum, and this spectral line does not belong to the background noise, but is a part of a band of harmonics or its fundamental frequency itself. The disadvantage here, however, is the complex fine-tuning required for the control of the system. The association function of the fuzzy set must thus be rectified in complex fine-tuning work. The disadvantage in this case is that only frequency lines or their harmonics are considered as fundamental frequency in this classification method.

SUMMARY

The problem to be solved by the invention is therefore to develop a method which improves the automatic classification of watercraft based on the sound waves emitted or transmitted by them.

Embodiments of the invention provide a method for classifying one or several watercraft using the sound waves emitted or sent by the watercraft. The sound waves are received by an array of underwater sound sensors of a sonar receiving system and processed into received signals, where at least one amplitude spectrum is generated from the received signals. According to embodiments of the invention, the characteristic vehicle parameters are determined using the sets of frequency lines and possibly individual lines contained in the amplitude spectrum, the values of the characteristic vehicle parameters are compared with the existing parameter values of a database, an associated matching factor is determined from the comparison of the characteristic vehicle parameters with the database parameters and the at least one watercraft is classified using the matching factor.

Embodiments of the invention also provide a device for classifying one or several watercraft using the sound waves emitted or sent by the watercraft, wherein the sound waves can be received by an array of underwater sound sensors of a sonar receiving system and can be processed into received signals, where at least one amplitude spectrum can be generated from the received signals. According to embodiments of the invention, the device comprises a frequency line pattern detection module, a data base comparison module, an evaluation module and an analysis module. The frequency line pattern detection module may be designed to determine the characteristic vehicle parameters using the sets of frequency lines and any available individual lines contained in the amplitude spectrum. The database comparison module may be designed to compare the width of the characteristic vehicle parameters with existing parameter values of a database. The evaluation module may be designed to determine a matching factor by comparing the characteristic vehicle parameters with the database parameters. The analysis module may be designed to output one classification for each watercraft using the matching factor.

Typically, propulsion systems and other machinery installations of a watercraft generate vibrations, resulting in generation of sound waves by this watercraft when it moves through water. These sound waves, together with the ambient noise, are received by sonar receivers of a sonar receiving set as received signals. In order to classify a watercraft, especially a surface vessel or a submarine, the received signals of the sonar receiving set are subjected to a frequency analysis to generate a complex frequency spectrum. The frequency spectrum usually consists of its absolute value, the amplitude spectrum and its phase, the phase spectrum.

Due to the propellers, turbines, transmission, generators, pumps etc., the amplitude spectrum shows frequency lines emerging from the general noise as distinct spikes. Here, a frequency line is a frequency or a small frequency range which extends over multiple frequency cells according to a predetermined frequency resolution.

According to the inventive method, the characteristic vessel parameters of the vessel to be classified are determined in a frequency line pattern detection module. For this, a target-oriented frequency line pattern contained in the amplitude spectrum is used.

A target-oriented frequency line pattern of a vessel includes those frequency lines, which are in a harmonious relationship with one another, i.e. have an approximately equal frequency spacing and belong to a common set of frequency lines and thus form a frequency line set. Further, a frequency line pattern includes possibly existing single lines. These are frequency lines which have a sufficient amplitude and cannot be assigned to any frequency line set. The frequency line pattern or the frequency line sets and single lines are determined by means of an automatic frequency line pattern detection and/or through manual input by the operator, and other classification information is taken into account.

Besides the frequency line pattern, the general line characteristics of the frequency lines are also considered in the classification, such as the shape of the frequency lines, which can be stable, diffuse, continuous, intermittent, cyclic, wide, or narrow. Also, specific line structures of the frequency lines can be considered in the classification, such as a distinctive multi-line structure. These line characteristics of frequency lines are detected in the automatic line pattern detection or are entered manually. From the line characteristics, the properties relevant for the classification of the vessel to be classified can be advantageously concluded.

The characteristic vessel parameters contain for example, engine information, propeller information and/or transmission information and are compared in a database comparison module with the existing parameter values of a database. From this comparison of the characteristic vessel parameters with the parameter values of the database, an associated matching factor is determined in an evaluation module which evaluates the comparison depending on the matches and deviations. In an analysis module, a classification of the watercraft is carried out on the basis of the matching factor and is output.

The classification according to the invention is effective because complete target-oriented frequency line patterns, i.e. frequency line sets and single lines, if present, are automatically calculated and/or considered within an amplitude spectrum for a comparison with known information.

Furthermore, several amplitude spectra from different frequency analyses can be considered in the classification, thereby greater reliability can be achieved advantageously in the classification.

In a preferred embodiment of the invention, the amplitude spectrum is determined by means of a DEMON (Detection of Envelope Modulation on Noise) analysis or LOFAR (Low Frequency Analysis and Recording) analysis. In the LOFAR analysis, an amplitude spectrum of an operating noise emitted by a vessel is generated, in which the frequency lines jut out of the general noise in the low frequency range. As these frequency lines are caused by the propulsion system and other machines on board the vessel, this low frequency range is particularly well suited for classifying the vessels.

In the DEMON analysis, the high frequency components of the received noise of the vessel to be classified are demodulated through a bandpass and an envelope demodulator. The amplitude spectrum generated therefrom provides information on the number of driving propellers, their number of blades and the speed. From this information, the vessel type can be concluded.

Preferably, the amplitude spectrum derived from a frequency spectrum through absolute-value generation is normalized. Thus, the frequency amplitudes in the entire frequency range are adjusted. This has the advantage that the amplitude spectrum enables a relative evaluation of the amplitudes, i.e. a comparison of the amplitude differences with regard to the respective frequency environments. Preferably, the amplitude spectrum is adapted to the distance of the vessel to be classified or to the loudness of the operating noise emitted by it.

Further, the amplitude spectrum is averaged over a predetermined period. This serves, on the one hand, to suppress noise and on the other hand, to present reliable frequency lines over time.

For the sake of simplicity, in the further course of the description, a spectrum of a received signal is understood as the amplitude spectrum or a spectrum derived from the amplitude spectrum.

In another preferred embodiment of the invention, the database can be extended during operation with new parameters. For this, the database is divided into a primary database and a temporary database. The primary database contains predefined parameter values for the characteristic vessel parameters for classifying a majority of known vessels. While the method according to the invention is in operation, if a vessel is detected, which is not yet stored in the primary database with its characteristic vessel parameters, the parameters can be stored along with their values in the temporary database in order to be able to advantageously classify such type of a vessel at the next contact with such a vessel.

According to another preferred embodiment of the invention, the frequency line patterns are automatically determined in the amplitude spectrum for every watercraft, whereby a target-oriented frequency line pattern is composed of one or more frequency line sets as well as any existing single lines.

For automatic determination of the frequency line sets in the amplitude spectrum, a predetermined number of the strongest frequency lines from the amplitude spectrum are determined and compared with each other, in order to form the so-called line pairs, wherein the frequencies of the harmonic line pairs are considered as candidates for frequency line sets. Thus, it is advantageously ensured that all frequency line sets are recorded.

In this case, a line pair is formed, if either the frequency of the first frequency line is a multiple of the frequency of the second frequency line, or the frequencies of the two frequencies to be compared is a multiple of the magnitude of the frequency difference between the two frequencies of the frequency lines to be compared.

If the frequencies are confirmed by virtue of special characteristics, temporary frequency line sets are formed. Special characteristics of the frequency line sets are in particular the number of frequency lines, sequences of frequency lines, particularly high amplitudes of the frequency lines, the fundamental frequency and the line density. After comparing the preliminary frequency line sets using an evaluation function, which is based on the special characteristics, the final frequency line sets are determined, whereby dependent frequency line sets such as frequency line sets with multiples of the fundamental frequency are excluded.

After the determination of all the frequency line sets, any existing single lines can be found in the amplitude spectrum. These are then all frequency lines which do not belong to a frequency line set, have a sufficiently large amplitude, lie above a minimum frequency, and are not caused by inherent noise. For this purpose, the possible single lines in the amplitude spectrum are automatically determined and combined with the frequency line sets into a target-oriented frequency line patterns by means of predetermined thresholds. The invention however is not limited to the automatic determination of the frequency line sets described above. Rather, any method for automatic line pattern detection is conceivable.

Based on the frequency line pattern the characteristics of a vessel can be derived advantageously. For every frequency line pattern determined, the characteristic vessel parameters are specified. These include, in addition to the engine parameters, transmission parameters and/or propeller parameters, also the particularly conspicuous frequency lines. Such automatically determined characteristic vessel parameters can be advantageously used for comparison with the existing database parameters in order to classify the associated vessel.

The automatic classification advantageously enables a periodic scanning of the noise sources of all detected vessels. Since an operator has to perform various tasks, in particular with respect to the detection using different sensors, track management and location preparation, in multi-contact situations, often there is not enough time left for a manual classification of all detected vessels. In that respect, the operator's workload is reduced. Also, through automatic classification, the classification process is accelerated. If there are significant classification characteristics available for a detected vessel and are recognizable, automatic classification enables the result of classification to be communicated shortly after the detection without any input from the operator.

In a further embodiment of the invention, the parameters themselves, the corresponding frequencies or frequency values and/or the quotients of the associated parameter values are used for the comparison of the characteristic vessel parameters with the parameters of the database. This is particularly advantageous when it is not known whether a certain frequency line is dependent on speed or not. Therefore, the search is not done primarily by device characteristics, but by frequencies and corresponding quotients. However, if a device assignment is known, this is also taken into account.

According to another preferred embodiment of the invention, the matching factor is determined by means of evaluation classes. Preferably, the parameters to be compared are weighted differently for the evaluation and assigned to one of these evaluation classes, so that the evaluation classes are divided, for example, into matching with the different weightings, not matching with or deviating from the different weightings and non-existing parameters. Further, each evaluation class receives a factor, with which this evaluation class is included in the calculation when determining the matching factor. This has the advantage that important parameters are given greater consideration in the classification than other, less significant parameters.

According to a further embodiment of the invention, the determined characteristic vessel parameters are combined to form a set of parameters. The comparison of the characteristic vessel parameters with the parameters of the database is then done in sets. That is, the parameter of the database are also combined into parameter sets, wherein every known vessel type is advantageously assigned a parameter set. In the database comparison module, the parameter set of the characteristic vessel parameters determined is compared with the parameter sets existing in the database to advantageously carry out a classification of the vessel based on a best match.

In a further embodiment of the invention, for the determination of the matching factor further measured data and/or input values are considered. For this purpose, the evaluation module has a corresponding input interface for the measured data or the input values. This has the advantage that the measured data or partial results from other sensors, such as, active sonar, electronic signatures from foreign radars, data from an automatic identification system, etc., are taken into account. Furthermore, it is advantageous to consider possible manual operator input.

In a further preferred embodiment of the invention, the method for classifying one or more watercraft is repeatedly applied, in particular automatically, and/or cyclic, wherein the corresponding classification results are saved or stored in a history. Preferably, after the first process run, the classification of every subsequent process run is done by taking into account the results of the previous classification. The consideration takes place in particular through correlation of the current classification result with other classification results of the history. This enables a refinement of the classification result advantageously.

According to another preferred embodiment of the invention, in the classification of one or more watercraft at least one restriction is imposed during a new process run, in that one or more vessel characteristics from the previous process run or process runs are considered when comparing the characteristic vessel parameters with the parameters of the database. This also enables the refinement of the classification result advantageously.

According to an alternative embodiment of the invention, the device according to the invention comprises one or more means for using the method described above.

BRIEF DESCRIPTION OF THE DRAWINGS

Other advantageous embodiments of the invention are apparent from the dependent claims and from the embodiments explained in detail using the drawing. In the drawings are shown:

DETAILED DESCRIPTION

Figure 1:
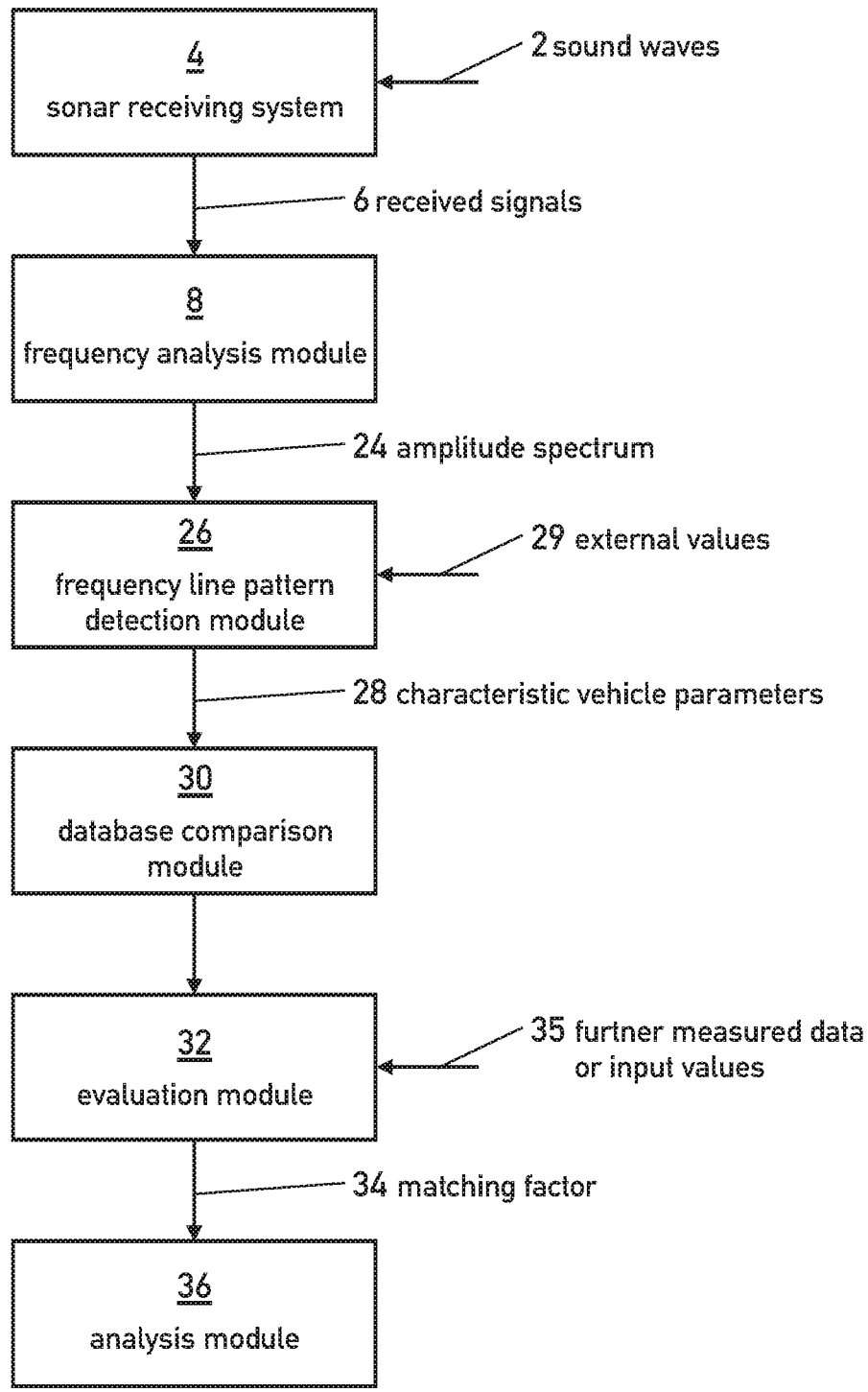
FIG. 1 a schematic representation of a flow chart of the method according to the invention, FIG. 2 an exemplary representation of a DEMON spectrum and FIG. 3 an exemplary representation of a LOFAR spectrum.

FIG. 1 shows a schematic representation of a flow chart of an embodiment of the method according to the invention, provided that a watercraft has been detected, the sound waves 2 emitted and/or transmitted by it are received by a sonar receiving system 4 and the corresponding received signals 6 are generated from it.

The received signal 6 is transferred to a frequency analysis module 8, which is designed such that it can perform at least one frequency analysis for generating a frequency spectrum.

The frequency spectrum of the received signal 6 of the sonar receiving system 4 is calculated via an application, for example Fourier Transform, and is made up of the absolute value, also called the amplitude spectrum and the phase, also called the phase spectrum. For using the method according to the invention, the amplitude spectrum or one of the spectra derived from the amplitude spectrum of the received signal 6 is considered.

Figure 2:
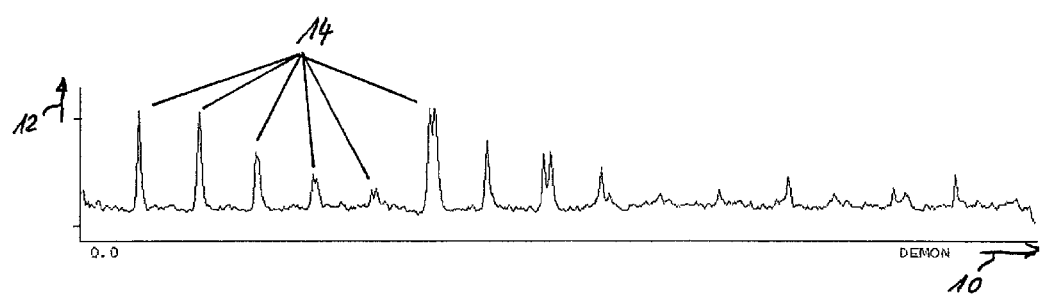

FIG. 2 shows an exemplary representation of a DEMON spectrum, wherein the spectrum is plotted against the frequency on a horizontal axis 10 and the associated frequency amplitudes are represented on a vertical axis 12. Using the illustrated DEMON spectrum, several significant frequency lines 14 can be identified, from which a frequency line pattern containing the corresponding propeller information can be derived.

Figure 3:
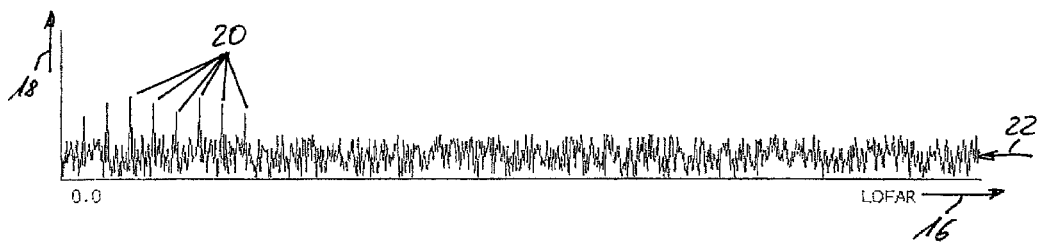

FIG. 3 shows an exemplary representation of a LOFAR spectrum, wherein too the spectrum is plotted against the frequency on a horizontal axis 16 and the associated frequency amplitudes are represented on a vertical axis 18. In this embodiment also, several frequency lines 20 can be identified which rise above the general noise level 22. From the LOFAR spectrum, noise sources such as diesel engines, turbines, generators, pumps and/or ventilators can be determined.

In the method according to the invention in FIG. 1, preferably one DEMON spectrum and one LOFAR spectrum each are generated by the frequency analysis module 8 to capture information on all noise sources on board the vessel to be classified.

The DEMON and LOFAR spectra are passed on as input data 24 to a frequency line pattern detection module 26, wherein preferably prominent frequency lines that are generated due to the noise sources of the own boat are characterized as eigenfrequency lines and are considered in the method according to the invention. In addition, the applicability of the measured frequency amplitudes, i.e. the sequence of the frequencies sorted according to amplitude as well as the ratios of the amplitudes are tested.

For each vessel to be classified, the amplitude spectra 24 of the frequency analysis module 8 are analyzed. The analysis of the amplitude spectra 24 is done through an automatic frequency line pattern detection within the frequency line pattern detection module 26. Alternatively or additionally, the evaluation can be done by the operator based on the spectra 24 output by the frequency analysis module 8. Manual inputs using graphics tools, such as a multi-point divider will be given preference.

Further, characteristic vessel parameters 28 are determined based on the frequency line pattern. A frequency line set with frequency lines as fundamental frequency and harmonics of this fundamental frequency of a DEMON spectrum gives, for example, propeller information, such as Propeller Shaft Rate (PSR), Number of Blades (NOB), Number of Shafts (NoS) and/or Blade Rate (BLR).

From the LOFAR spectrum engine information can be determined on the basis of certain frequency line sets. The characteristic vessel engine parameters include for example, cylinder rate (CR), crank shaft rate (CSR), engine firing rate (EFR) and/or number of cylinders (NOC).

If there are several frequency line sets with frequency lines of a fundamental frequency and its harmonics present in the LOFAR spectrum, this indicates other machines such as turbines, generators, pumps, ventilators, which also produce a characteristic pattern under the frequency line sets. Thus, other characteristic vessel parameters 28 can be derived from the LOFAR spectrum.

Further, it is possible for example, through operator intervention, to pass on to the frequency line pattern detection module 26, external values 29 which should be taken into account for the determination of the characteristic vessel parameters 28.

Preferably single lines are also determined within the LOFAR spectrum manually and/or by means of automatic frequency line pattern detection. The single lines also represent a characteristic feature of a vessel and are stored as characteristic vessel parameters 28. The characteristic vessel parameters 28 are then passed on to a database comparison module 30.

In the database comparison module 30, the values of the characteristic vessel parameters 28 are compared with the parameter values existing in the database. For the purpose of comparison, the characteristic vessel parameters 28 are combined into a parameter set. The database also has a variety of parameter sets, in which a majority of the parameters are stored, which are characteristic for individual vessel types.

Each known vessel type is assigned a parameter set in the database. Thus, the watercraft are divided for example, broadly into ship types according to size, construction, type of drive and intended use, in particular as freight ship, warship, passenger ship or leisure boat. With such a type of broad classification, the operator receives a convenient support to help him/her concentrate on the most important tasks.

If the available database includes detailed parameter sets, the ship types can be further divided into sub-types, which specify the respective areas of application. This enables the advantageous use of the invention-related method, without operator intervention.

If the database has a temporary database, which can be filled with new vessels or new vessel parameters during operation, the new vessels or existing vessel parameters of the primary database can thus be extended with additional characteristic parameters. The database can thus be advantageously adapted to different needs and different areas of application.

When comparing the values of the characteristic vessel parameters 28 with the existing parameter values of the database, the parameter sets are compared and the degree of match is determined. The parameters are included in the evaluation according to their significance. The number of parameters as well as the parameters themselves must not necessarily be the same in both sets of parameters being compared. Values of individual characteristic parameters that are either not found or are non-existent are not a criterion for exclusion, but are a deviation in the case of very significant parameters, such as the number of blades. Based on the list of vessels database sorted according to the degree of match and a feedback regarding the match of individual parameters, the operator can evaluate the result of the classification conclusively or if necessary, improve it later.

The characteristic vessel parameters 28, however, include not only the directly determined values for information on propeller, engine and/or transmission but also the quotients of individual values, in particular quotients of the fundamental frequencies of harmonic LOFAR frequency line sets and fundamental frequencies of harmonic DEMON frequency line sets. Thus, for example, the quotient of the crankshaft rotation frequency and propeller shaft rotational frequency (CSR/PSR) gives a reduction ratio (RR-Reduction Ratio) of the drive shaft rotation frequency to propeller shaft rotational frequency, which is an important, significant vessel parameter. But also other quotients of machine-related harmonic fundamental frequencies and propeller related harmonic fundamental frequencies (ERA/PSR, CR/BLR, and/or ERC/BLR) are significant vessel parameters which have been advantageously taken into account in the method described herein.

Another vessel parameter is Turns Per Knots (TPK), the values of which are stored in the database for different gear ratios of the watercraft. However, a prerequisite for the use of this parameter for comparison with the database is that the propeller shaft rotational frequency and the speed of the vessel to be classified must be known. Information on speed can be gathered for example, through the use of additional sensors or methods, e.g. Target Motion Analysis.

When considering the single lines of the LOFAR spectrum in a parameter set to compare the characteristic vessel parameters 28 with the parameters of the database, a distinction is made whether the associated noise source is known or unknown.

If the noise source of the associated single line is known, this information is taken into account in the comparison. If the single line is a speed-independent frequency line, its frequency is compared in absolute terms with the corresponding frequency of the associated database entry.

If the single line, on the contrary, is a speed-dependent frequency line, the quotients of this frequency and the frequencies of other speed-dependent frequency lines will be compared, such as transmission frequency/propeller shaft rotational frequency (G=Gear Line/PSR=Propeller Shaft Rate).

If the noise source of the corresponding single line is not known, the frequency of this single line is compared in absolute terms with the frequency values of the database. Further, this frequency is compared with the values of the database as quotient relative to the harmonic frequencies of a frequency line set determined for this vessel, such as the ratio of the frequency to the propeller shaft rotational frequency (f/PSR).

Similarly, the quotients of the frequencies of the sharpest single lines can be considered and compared with the quotients of the frequencies of the single lines stored in the database. For this the number of single lines to be considered is predetermined or can be defined at the beginning of the method.

When comparing the determined parameter set of the characteristic vessel parameter 28 with the parameter sets of the database, this comparison is accordingly evaluated by an evaluation module 32 and an associated matching factor 34 is determined. Here the parameters are weighted differently, as the influence of some parameters on the classification of the vessels is greater than the other parameters.

The weighting of the parameter for classification and determination of a matching factor 34 is thus for example, considered as lower weighting, average weighting and higher weighting. The invention is however not limited to the three above-mentioned weighting. Rather, any number of different weightings of the parameters is possible for the classification.

The evaluation of the parameter to be compared is done by dividing into evaluation classes. In the process, a distinction is made between matches with the different weightings, no matches or deviations from the different weightings and non-existent parameter, i.e. there is no entry in the database for the characteristic vessel parameter determined or a parameter related to the identified ship type of the associated vessel parameter has not been measured or determined as a characteristic vessel parameter. Each evaluation class receives a factor, with which this evaluation class is included in the calculation for determining a matching factor 34.

Each comparison of a parameter set from the characteristic vessel parameters is then assigned a matching factor, which has a value range from zero to 1 or from very uncertain to very certain, and provides reliability to the associated classification.

For the determination of the matching factor 34, the number of matches and the number of deviations per evaluation class of the individual parameters of the parameter sets to be compared are counted. For example, it is counted how many matches exist under the parameters with high weighting, how many matches under parameters with medium weighting, how many matches for parameters with low weighting, how many deviations are there with low weighting, how many deviations with medium weighting and how many deviations with high weighting. The query for matching takes place within a tolerance range, which is set depending on the parameter.

Thus for example, the parameters for the propeller shaft rotational frequency (PSR), propeller blade frequency (BLR), cylinder frequency (CR) and engine firing rate (EFR) get only a low weighting when compared to the corresponding parameters of the database for different speed levels of the vessel both for a match and a deviation in the determination of the matching factor 34. The parameter for the Turns per Knot (TPK) on the other hand is included in the determination of the matching factor 34 with a medium weighting.

The weighting for a match may be different from the one for a deviation. The number of blades (NOB), the number of propeller shafts (NOS) and the number of cylinders (NOC) for example, are included with a medium weighting for a match in the determination of the matching factor 34. A deviation however has a severely restrictive effect due to a high weighting in the determination of the matching factor 34.

When considering the single lines in the amplitude spectrum, in the case of unknown noise sources, the absolute frequencies of the determined single lines are also included with medium weighting in the determination of the matching factor 34, since these frequencies may possibly be speed-dependent. If the harmonics of the frequency line sets are known for the propeller shaft rotational frequency (PSR), propeller blade rate (BLR), cylinder rate (CR) and/or the engine firing rate (EFR), the frequency of a measured single line is included in the determination of the matching factor 34 as quotient with the frequency of one of the harmonics with a medium weighting, as this frequency can also be speed dependent. It is also possible to consider the quotients from the frequency of the measured single line with the frequency of one of the sharpest single lines of the associated database entry for the determination of the matching factor 34.

The comparison of the quotients of the harmonic frequencies from the engine size and the propeller size, such as the quotient of the crankshaft rotation frequency and the propeller shaft rotational frequency (CSR/PSR), which indicates the reduction ratio (RR) as an important, significant parameter, is included with a high weighting in the determination of the matching factor 34.

Similarly, those single lines for which associated noise sources are known, are included, both as absolute frequencies and as relative frequencies of the harmonics of known frequency line pattern sets, with a high weighting in the determination of a matching factor.

The matching factor 34 is thus dependent on the individual characteristic vessel parameters 28, which are used for classification. The invention is however not restricted to the parameter weighting described above. The assignment of a high, medium or low weighting is modifiable. Depending on the requirement, the parameters can be assigned to different evaluation classes and the weighting can be adjusted according to the requirement.

The evaluation of the comparison described above is based on the characteristic vessel parameters 28, which were determined on the basis of the measurement results of a passive sonar system. Alternatively, however, for the determination of the matching factor 34 in addition to an input by the operator 35, existing measured data from other sensors 35, such as, active sonar and partial results of other systems 35, such as, electronic signatures from other radar systems, and/or data of an automatic identification system, can also be considered. The method according to the invention exchanges information with the system environment, especially data from the target tracking method or the target motion analysis, such as target CPA (Closest Point of Approach—point of minimum distance), target motion parameter and/or target intersection situations.

The results of the comparisons of the parameter sets of the characteristic vessel data 28 with the parameter sets of the database, together with the matching factors 34 determined for these comparison, are passed on to an analysis module 36. The results are accordingly processed to present a list of classifications, e.g. ship types for the detected watercraft each with the associated matching factor 34, on an output, especially a display screen. The classifications shown on the list can be sorted in different ways, for example, according to size of the matching factor 34 or the associated country abbreviation of the vessel. The display of individual parameter queries is possible optionally. The classification process is carried out, on the one hand in the current time, so that a temporary result is determined, and on the other hand, it is carried out over a predetermined period of time, so that an overall result is obtained over time. In particular, significant frequency changes, e.g. as a result of a change in target speed, can have a significant impact on the overall classification result.

In addition, the classification process is automatic, periodic and/or continuous, where an automatic classification process refers to a method without operator intervention, a periodic classification process refers to a periodically repeating process run, e.g., after receiving the signals of a watercraft again and a continuous classification process refers to a carrying out the procedure again without interruption according to the invention.

Preferably, the classification result is checked after every process run by correlating the results based on the current input data with results obtained previously. The respective results of the classification can be advantageously refined by considering a history of the classification results.

In addition, the very broad classification result can be refined after the first process run according to the invention, by including restrictions when the process is executed again. For example, one can search for specific characteristics considering the database parameters when comparing the characteristic vehicle parameters with the parameters of the database.

Preferably, the operator gets an appropriate message on the display to check the automatically determined measured data and influence the result if required. In addition, the method according to the invention is suitable as a background method for monitoring many detected vehicles, because changes in the speed and/or new classification results can be reported immediately using this method.

Preferably, the frequency line patterns that are determined using the method according to the invention are interpreted directly. In doing so, the interpretation partly takes place as part of the automatic line pattern detection in the frequency line pattern detection module 26 or within the classification process using rules or database information. Thus, for example, certain frequencies can be assigned to certain devices based on the database information and the line characteristics based on rules. In addition, specific line structures can also be directly assigned to certain ship classes.

By adjusting the parameterization, the method according to the invention can also be used without operator control, which will enable the use in unmanned systems such as coastal surveillance, sonar buoys, small submarines, etc.

Another embodiment of the invention proposes a gradual optimization of the result by varying the tolerance ranges. Especially, the frequency is focused automatically by testing different frequency tolerance ranges when comparing the database and when evaluating the results, where the frequency tolerance ranges consider, for example, a Doppler effect or measuring inaccuracy. Preferably, the tolerance range is selected automatically depending on the database. To restrict the number of possible classes of ships during the classification, the Doppler tolerance range is, for example, reduced depending on the database. The result is then optimized by gradually adjusting the tolerance range and by comparing the associated evaluation of the result.

All the characteristics mentioned in the above description and in the claims can be used as per the invention both individually and in any combination with each other. The publication of the invention is hence not restricted to the described or claimed combinations of the characteristics. In fact, all the combinations of individual characteristics should be considered as published.

The invention claimed is:

1. Method for classifying one or several watercraft using the sound waves emitted or sent by the watercraft, wherein the sound waves are received by an array of underwater sound sensors of a sonar receiving system and processed into received signals, where at least one amplitude spectrum is generated from the received signals, the method comprising:
determining the characteristic vehicle parameters using sets of frequency lines and individual lines contained in the amplitude spectrum,
comparing the values of the characteristic vehicle parameters with the existing parameter values of a database,
determining an associated matching factor from the comparison of the characteristic vehicle parameters with the database parameters,
classifying the at least one watercraft using the matching factor, and
comparing the quotients of the strongest individual lines with the quotients of the frequencies of the existing parameter values for individual lines in the database.

2. Method according to claim 1,
wherein
the amplitude spectrum is determined using a DEMON analysis or LOFAR analysis, wherein the amplitude spectrum is averaged and normalized over a predefined time period.

3. Method according to claim 1,
wherein
the sets of frequency lines and any available individual lines in the amplitude spectrum are automatically determined for each watercraft.

4. Method according to claim 1,
wherein
for comparing the characteristic vehicle parameters with the database parameters, one or more of the parameters themselves, the associated frequencies or the individual quotients of the associated parameter values are used.

5. Method according to claim 1,
wherein
the matching factor is determined using evaluation classes and every parameter to be compared is assigned to one of these evaluation classes, where the evaluation classes are respectively used with an associated factor in determining the matching factor.

6. Method according to claim 1,
wherein
the determined characteristic vehicle parameters are combined into one set of parameters for each watercraft and the characteristic vehicle parameters are compared with the database parameters set by set.

7. Method according to claim 1,
wherein
further measured data or input values are considered for determining the matching factor, the further measured data comprising any of results from active sonar sensors, electronic signatures from foreign radars, and data from an automatic identification system.

8. Method according to claim 1,
wherein
the classification process is repeated, where a classification result is set up for each process run and
the classification is refined by considering earlier results of the classification.

9. Device for classifying one or several watercraft using the sound waves emitted or sent by the watercraft, wherein the sound waves can be received by an array of underwater sound sensors of a sonar receiving system and can be processed into received signals, where at least one amplitude spectrum can be generated from the received signals,
the device comprising
a frequency line pattern detection module, designed to determine the characteristic vehicle parameters using the sets of frequency lines and any available individual lines contained in the amplitude spectrum,
a database comparison module designed to compare the width of the characteristic vehicle parameters with existing parameter values of a database,
an evaluation module designed to determine a matching factor by comparing the characteristic vehicle parameters with the database parameters, and
an analysis module designed to output one classification for each watercraft using the matching factor,
wherein said database comparison module is further designed to compare quotients of the strongest individual lines with the quotients of the frequencies of the existing parameter values for the individual lines of the database.

10. Device according to claim 9,
wherein
the database is designed such that it has a temporary database in addition to a basic database consisting of parameter values of known watercraft, which can be expanded with new parameters.

11. Device according to claim 9,
wherein
the frequency line pattern detection module is designed so as to automatically determine the associated sets of frequency lines and any individual lines present in the amplitude spectrum for each watercraft.

12. Device according to claim 9,
wherein
the database comparison module is designed in such a way that any of the parameters themselves, the associated frequencies and individual quotient of the associated parameter values can be used for comparing the characteristic vehicle parameters with the database parameters.

13. Device according to claim 9,
wherein
determined characteristic vehicle parameters are combined to form a set of parameters and
the database comparison module is further designed such that the characteristic vehicle parameters are compared with the database parameters set by set.

14. Method according to claim 4,
wherein
the individual quotients are quotients of the basic frequencies of the harmonic frequency line sets.

15. Method according to claim 8,
wherein
the classification process is repeated periodically.

16. Method according to claim 8,
wherein
the classification is refined through correlation.

* * * * *